L. C. TIPPER.
BOOT FOR ANIMALS INCLUDING POULTRY AND OTHER BIRDS.
APPLICATION FILED JULY 31, 1913.

1,087,054. Patented Feb. 10, 1914.

Witnesses
John C. Sanders
Chauncey P. Carle

Inventor
Lawrence Clarke Tipper
BY Wm. Wallace White
ATT'Y

COLUMBIA PLANOGRAPH CO., WASHINGTON, D. C.

UNITED STATES PATENT OFFICE.

LAWRENCE CLARKE TIPPER, OF BIRMINGHAM, ENGLAND.

BOOT FOR ANIMALS INCLUDING POULTRY AND OTHER BIRDS.

1,087,054.  Specification of Letters Patent.  Patented Feb. 10, 1914.

Application filed July 31, 1913. Serial No. 782,160.

*To all whom it may concern:*

Be it known that I, LAWRENCE CLARKE TIPPER, a subject of His Majesty the King of Great Britain and Ireland, residing at "Ribbesford," Wake Green Road, Moseley, Birmingham, England, have invented new and useful Improvements in Boots for Animals including Poultry and other Birds, of which the following is a specification.

This invention has reference to boots and like feet coverings for animals such as sheep, pigs, cattle, dogs, poultry and other birds when diseased or injured, my said boots or feet coverings being principally intended to contain some ointment or other medicinal compound or substance for the treatment of animals' diseased or injured feet.

The object of my invention is to provide a boot or foot covering which will be thoroughly sanitary and efficient and will be so cheap as to enable it to be destroyed after it has served its purpose and thus reduce the risk of infection or contagion.

An animal's boot or foot covering constructed in accordance with this invention comprises a comparatively stiff lower cup like portion adapted to receive the lower portion of the animal's foot and having above this a comparatively soft and pliable upper portion which by means of a string or other suitable attachment can be tied or otherwise fixed or fastened around the animal's leg above the fetlock so as to secure the complete boot or covering to the foot. If desired said pliable upper portion may be made in the form of a bag or pouch in the lower part of which the comparatively stiff lower cup like portion is contained.

I will describe my invention by referring to the accompanying drawings on which—

Figure 1:
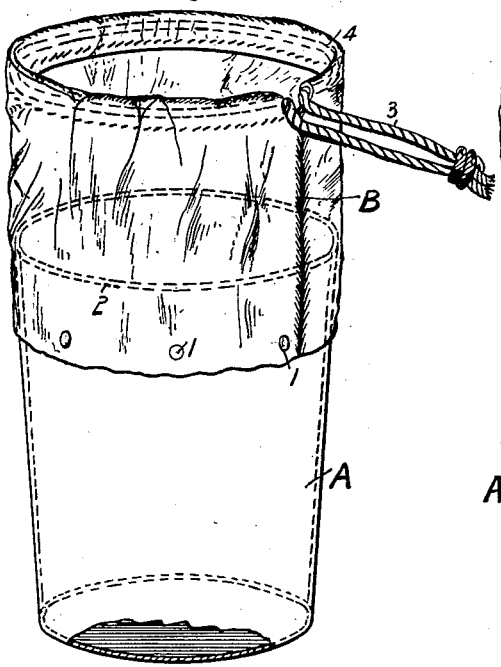
Figure 2:
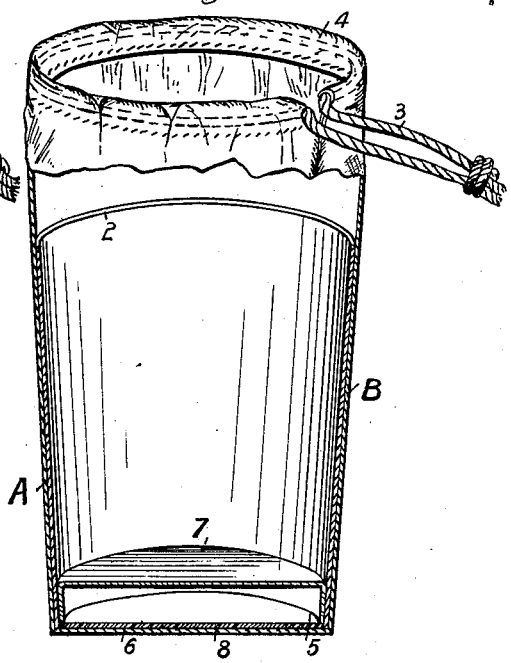
Figure 4:
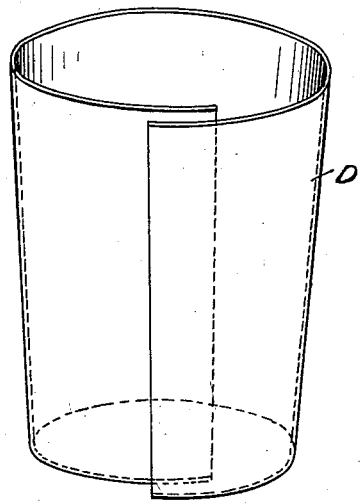
Figure 3:
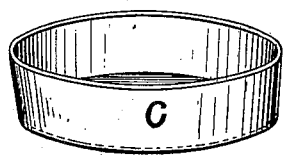
Figure 5:

Figure 1 represents a boot or foot covering constructed in accordance with this invention; Fig. 2 is a part sectional elevation of a preferred form of the same; Fig. 3 shows a modified construction of cup or internal stiffening part for the boot or foot covering constructed in accordance with this invention; Fig. 4 shows a general view of an alternative construction of the so called cup or native stiffened lining part of my invention; and Fig. 5 represents a disk for stiffening the bottom part of some forms of my invention as hereinafter described.

In the arrangement of my invention illustrated by Fig. 1 the comparatively stiff lower cup like portion is marked A and the comparatively soft and pliable upper portion is marked B and this is fixed to the upper part of the cup like portion A by any convenient means as for instance by rivets 1. The upper part of the soft or pliable portion B is continued above the top 2 of the cup like portion A far enough to tie around the leg above the fetlock, any suitable means being employed for securing it such for instance as the string 3 which is threaded through a hem or runner 4 in the top of the flexible part B. The lower comparatively stiff cup like portion A of the boot or foot covering is made of any suitable cheap material such for instance as compressed wood pulp, straw pulp, papier mâché or the like of a suitable shape, but preferably of an ordinary taper circular cup like shape shown in Fig. 1. It will be understood however that if desired the shape of this cup like part A may be made to correspond with the animal's foot. Moreover the cup like part A may be smooth internally or roughened and if desired or necessary may be lined with corrugated paper or the like or fitted with tow, wool, or other suitable material for the application of medicinal material, or to render the boot better fitting on the animal's foot. The soft flexible portion B of the boot or foot covering is formed of linen, canvas, cloth or other suitable material and may be fitted as aforesaid with any suitable attachment such for instance as the runner string 3, or a buckle and strap, or a button, or hook and eye, or spring fastener, which will secure it sufficiently tightly around the animal's leg.

In the preferred form of my invention the flexible upper portion B, may as shown in Fig. 2, be made in the form of a bag or pouch of the proper size to receive the comparatively stiff cup like portion A and in which the said cup like portion A will then be contained, the bottom 5 of the cup like portion A fitting in the bottom 6 of the bag or pouch like part B.

Where the comparatively stiff cup like portion A is of the form which has the bottom part 7 raised at some little distance above the base 5 of the cup as in Fig. 2 the bottom of the bag or pouch B may be strengthened by placing in the bottom thereof a disk 8 of stiff straw board or other suitable material on to which the bottom 7 of the cup like part will be pressed by the weight of the animal's foot. The comparatively stiff lower cup like portion of the appliance is, as a further modification of my invention, formed by simply employing a piece of straw board or other suitable paper material, either plain, or of the well known corrugated kind which is used for packing breakable articles, which is made of such a length and width as to allow of its being rolled up into a cylindrical or taper circular form such as shown in Fig. 4 and is placed within the lower part of the bag or pouch part B so as to stiffen the same as aforesaid and serve the purpose of the cup A. When a piece of straw board or other suitable material is used in this way with a bottom strengthening disk such as 8 Fig. 5 it is sufficient to hold the antiseptic pad or dressing or other medicinal matter in position around the foot.

Fig. 3 shows a modified form of cup marked C which is made shallow and is intended to be used in the bottom of the bag or pouch part B in place of the taper cup like part A shown in Fig. 2.

Where the substance from which the boot is made lends itself to the purpose any of the boot or foot coverings above described or parts of the same may be saturated or coated with any suitable chemical, medicinal or antiseptic preparation for the more effective treatment of disease and to render the boot or foot covering antiseptic.

When a stiffened lining such as D is used in the bag or pouch it is preferred to be of the corrugated kind above described because the spaces between the corrugations permit of ventilation of the foot.

What I claim as my invention and desire to secure by Letters Patent is:—

A boot or foot covering for animals, poultry or the like, comprising an inner cup of comparatively rigid material, a pouch or bag of comparatively flexible material surrounding and projecting above said cup, said cup being formed with its bottom raised slightly above its lower edge, a disk of stiffening material adapted to be inserted in the bottom of said bag or pouch to support the lower edge of said cup, said flexible bag being provided at its upper end with a runner string adapted to fasten said boot around the animal's leg.

In testimony whereof I have signed my name to this specification in the presence of two subscribing witnesses.

LAWRENCE CLARKE TIPPER.

Witnesses:
 CHARLES BOSWORTH KERLEY,
 ERNEST HARKER.

---

Copies of this patent may be obtained for five cents each, by addressing the "Commissioner of Patents, Washington, D. C."